United States Patent [19]
Faykish et al.

[11] Patent Number: 5,683,774
[45] Date of Patent: Nov. 4, 1997

[54] DURABLE, TAMPER RESISTANT SECURITY LAMINATE

[75] Inventors: Lynn E. Faykish, Minneapolis; Douglas K. Fossum, Shoreview, both of Minn.

[73] Assignee: Minnesota Mining and Manufacturing Company, St. Paul, Minn.

[21] Appl. No.: 602,638

[22] Filed: Feb. 16, 1996

Related U.S. Application Data

[63] Continuation of Ser. No. 352,929, Dec. 9, 1994, abandoned.
[51] Int. Cl.$^6$ .................... B32B 7/06; B32B 7/14
[52] U.S. Cl. .................... 428/40.1; 428/41.7; 428/41.8; 428/42.1; 428/43; 428/201; 428/202; 428/480; 428/516; 428/915; 40/299; 283/81; 283/101
[58] Field of Search .................... 428/40.1, 43, 349, 428/483, 916, 915, 41.7, 41.8, 41.9, 214, 42.1, 195, 201, 41.1, 202, 480, 516; 283/72, 81, 101, 107, 108, 109, 110; 40/299; 206/807

[56] References Cited

U.S. PATENT DOCUMENTS

| | | | |
|---|---|---|---|
| Re. 24,906 | 12/1960 | Ulrich | 206/59 |
| 1,003,443 | 9/1911 | Erickson | 283/103 |
| 2,181,252 | 11/1939 | Vogel | 229/80 |
| 3,239,478 | 3/1966 | Harlan, Jr. | 260/27 |
| 3,487,567 | 1/1970 | Waybright | 40/22 |
| 3,631,617 | 1/1972 | Pekke | 40/2.2 |
| 3,801,183 | 4/1974 | Sevelin et al. | 350/105 |
| 3,802,724 | 4/1974 | Gosnell | 283/9 |
| 3,864,855 | 2/1975 | Pekko et al. | 40/2 |
| 3,891,242 | 6/1975 | Arnold et al. | 283/6 |
| 3,923,198 | 12/1975 | Brochman | 220/359 |
| 3,925,584 | 12/1975 | Suzuki et al. | 428/40 |
| 3,933,304 | 1/1976 | Judd | 229/62 |
| 3,935,960 | 2/1976 | Cornell | 220/260 |

(List continued on next page.)

FOREIGN PATENT DOCUMENTS

| | | |
|---|---|---|
| 0 000 401 | 7/1978 | European Pat. Off. . |
| 0 396 428 | 11/1990 | European Pat. Off. . |
| 0 491 099 | 6/1992 | European Pat. Off. . |
| 2 451 081 | 10/1980 | France . |
| 2 597 405 | 10/1987 | France . |
| 25 11 367 | 10/1975 | Germany . |
| 28 03 434 | 8/1979 | Germany . |
| 29 52 322 | 8/1988 | Germany . |
| 2 173 150 | 10/1986 | United Kingdom . |
| 2 200 337 | 8/1988 | United Kingdom . |

OTHER PUBLICATIONS

Brochure entitled "Turn Your Label Into A Security System"; 3M Identification and Converter Systems Division; Form No. 70-0703-5359-7 (71.5)ii (1991).

Permanent Data page —Scotch™ Label Component System; 3M Identification and Converter Systems Division; Form No. 0-0704-8194-3 (23.3)R1 (Jan. 28, 1993).

(List continued on next page.)

*Primary Examiner*—Rena Dye
*Attorney, Agent, or Firm*—Gary L. Griswold; Walter N. Kirn; Peter L. Olson

[57] ABSTRACT

A security laminate comprising (1) a protective layer having a first and a second surface, (2) a pattern of low adhesion coating bonded to a portion of the second surface of the protective layer, (3) at least one emblem bonded to a portion of the low adhesion coating/protective layer composite, (4) an adhesive bonded to the emblem layer/low adhesion coating/protective layer composite, and (5) a primer is not included between the low adhesion coating and emblem layers; wherein the bond between the emblem and the protective layer and the bond between the adhesive layer and protective layer are the most tenacious bonds, and the bond between the low adhesion coating and the protective layer is the least tenacious, whereby the emblems and adhesive layers are damaged in the pattern of the low adhesion coating during delamination. Also, secured documents comprising such security laminates and a method for securing documents utilizing such security laminates.

17 Claims, 2 Drawing Sheets

U.S. PATENT DOCUMENTS

| | | | |
|---|---|---|---|
| 4,028,165 | 6/1977 | Rosenfeld | 156/234 |
| 4,068,028 | 1/1978 | Samonides | 428/40 |
| 4,082,873 | 4/1978 | Williams | 428/40 |
| 4,121,003 | 10/1978 | Williams | 428/40 |
| 4,180,929 | 1/1980 | Schultz, Jr. | 40/2.2 |
| 4,184,701 | 1/1980 | Franklin et al. | 283/9 |
| 4,246,307 | 1/1981 | Trautwein | 428/43 |
| 4,475,661 | 10/1984 | Griffin | 215/366 |
| 4,505,399 | 3/1985 | Weiner | 215/230 |
| 4,557,505 | 12/1985 | Schaefer et al. | 283/81 |
| 4,588,465 | 5/1986 | Paciorek | 156/220 |
| 4,608,288 | 8/1986 | Spindler | 428/78 |
| 4,627,642 | 12/1986 | Peronneau et al. | 283/92 |
| 4,630,891 | 12/1986 | Li | 350/105 |
| 4,652,473 | 3/1987 | Han | 428/35 |
| 4,653,113 | 3/1987 | Taylor | 383/5 |
| 4,684,554 | 8/1987 | Ou-Yang | 428/35 |
| 4,709,396 | 11/1987 | Voshall et al. | 383/5 |
| 4,709,397 | 11/1987 | Voshall et al. | 383/5 |
| 4,717,615 | 1/1988 | Reinhart | 428/161 |
| 4,718,553 | 1/1988 | Adamoli et al. | 206/459 |
| 4,721,217 | 1/1988 | Phillips et al. | 215/230 |
| 4,721,638 | 1/1988 | Matsuguchi et al. | 428/40 |
| 4,728,377 | 3/1988 | Gallagher | 156/58 |
| 4,737,559 | 4/1988 | Kellen et al. | 526/291 |
| 4,746,556 | 5/1988 | Matsuguchi et al. | 428/40 |
| 4,747,620 | 5/1988 | Kay et al. | 283/86 |
| 4,760,919 | 8/1988 | Pereyra | 206/484.2 |
| 4,763,931 | 8/1988 | Matsuguchi et al. | 283/108 |
| 4,772,650 | 9/1988 | Ou-Yang | 524/271 |
| 4,773,677 | 9/1988 | Plasse | 283/77 |
| 4,804,096 | 2/1989 | Harding | 215/228 |
| 4,838,708 | 6/1989 | Holcomb et al. | 383/5 |
| 4,856,857 | 8/1989 | Takeuchi et al. | 350/3.6 |
| 4,876,123 | 10/1989 | Rivera et al. | 428/34.2 |
| 4,908,285 | 3/1990 | Kushibiki et al. | 430/1 |
| 4,913,504 | 4/1990 | Gallagher | 350/3.6 |
| 4,915,994 | 4/1990 | Begelfer et al. | 428/40 |
| 4,937,040 | 6/1990 | Holcomb et al. | 383/5 |
| 4,941,196 | 7/1990 | Edelman et al. | 383/5 |
| 4,972,953 | 11/1990 | Friedman et al. | 206/459 |
| 4,980,222 | 12/1990 | Rivera et al. | 428/195 |
| 4,988,547 | 1/1991 | Voto, Jr. et al. | 428/35.2 |
| 4,998,666 | 3/1991 | Ewan | 229/102 |
| 5,008,139 | 4/1991 | Ochi et al. | 428/40 |
| 5,080,463 | 1/1992 | Faykish et al. | 359/536 |
| 5,082,702 | 1/1992 | Alband | 428/36.92 |
| 5,104,719 | 4/1992 | Kamen et al. | 428/195 |
| 5,153,042 | 10/1992 | Indrelie | 428/40 |
| 5,169,707 | 12/1992 | Faykish et al. | 428/195 |
| 5,277,971 | 1/1994 | Weng et al. | 428/343 |
| 5,294,470 | 3/1994 | Ewan | 428/40 |
| 5,319,475 | 6/1994 | Kay et al. | 359/2 |
| 5,346,259 | 9/1994 | Mocilnikar et al. | 283/108 |
| 5,358,281 | 10/1994 | Greig | 283/81 |
| 5,405,692 | 4/1995 | Weng et al. | 428/343 |

OTHER PUBLICATIONS

Technical Report —The Label Component System Process Guide; 3M Identification and Converter Systems Division; Form No. 70–0703–5364–7(81.5)R1 (undated).

Do "Marketeers" Miss the Tremendous Capabilities of Embossed Holograms?; Papier & Kunststoff Verabeiter; (Dated 1986).

White light holograms for credit cards by K.J. Schell, SPIE vol. 523 Applications of Holography (1985) pp. 331–335.

Using Embossed Holography to Enhance Package Appeal; Russell R. Lacoste; 1987 Polymers, Laminations and Coatings Conference; pp. 285–287.

Rainbows at Work —Holographic Substrates; Kirk Meade; Screen Printing, vol. 75, No. 1, Jan. 1985; pp. 50, 52, 53A.

Holographic Advances Open New Dimensions for Converters; S.F. Mann; Paper, Film & Foil Converter; Jul. 1986; pp. 36–38.

Labels & Labelling: Holograms Labelling. Packaging Week; Sep. 10, 1986; p. 241.

Holographic Films; Anon; Food Drug Packag. vol. 50, No. 3, Mar. 1986; p. 58.

Brochure entitled "Scotch™ Protected Graphics Systems"; Converter Specialties Division/3M; Form No. 70–0701–7040–5(126.5)R1 CFD 168A (undated).

Brochure entitled "Tamper Resistant Packaging from 3M", 3M Tamper Resistant Packaging Center/3M; (undated).

Brochure entitled "SecurMark™ Labeling Systems —Built in Destruct Pattern Clearly Indicates Tampering"; 3M Converter Specialties Division; Form No. 70–0702–2444–0 (undated).

Brochure entitled "SecurMark™ Computer Imprintable Labeling System"; 3M Converter Specialties Division; Form No. 70–0702–7605–3 (79.5)ii (undated).

Brochure entitled "Label Component Systems —Create Your Own Customized Tamper–Indicating Labels with Scotch™ Brand Label Components"; 3M Converter Specialties Division; Form No.70–0702–7690–5 (30.5)ii (undated).

DURABLE, TAMPER RESISTANT SECURITY LAMINATE

This application is a continuation of U.S. application Ser. No. 08/352,929, filed Dec. 9, 1994, now abandoned.

1. Field of Invention

This invention relates to security laminates such as are used to protect documents from tampering or alteration.

2. Background of the Invention

Security laminates are traditionally used to protect documents or packages to ensure that the underlying items are not altered. Security laminates are particularly useful on identification cards such as driver's licenses and passports, and on other important documents such as certificates of title. Security laminates are also useful as protective labels on medications, video cassettes, and compact discs. Four features are particularly important when producing and using security laminates. First, once applied to an article it is important that the laminate is difficult to remove to ensure that the underlying item is not altered or subjected to tampering. Second, a desirable laminate is difficult if not impossible to duplicate by counterfeiters. Third, if tampering occurs it is important to quickly and accurately recognize an altered or counterfeit laminate. Fourth, it is important that manufacturing and application costs of the laminates are not prohibitively expensive.

Security laminates are constructed of various materials. In order to overcome the problem of counterfeit documents, manufacturers have made it exceedingly difficult for counterfeiters to duplicate the security laminate used on a particular document. Some constructions require special viewing devices to discern whether or not the laminate was subjected to tampering. Such laminates are disclosed in U.S. Pat. Nos. 4,630,891, 5,080,463, and 5,169,707. These laminates were multilayer films comprising a monolayer of microspheres at least partially embedded in a binder layer, typically with associated specular or diffuse reflective layers, to impart a retroreflective appearance to the document. The microsphere-containing layer is printed with a customer-specified logo. The retroreflective layer is then adhesively bound to the document. These constructions are difficult to imitate by counterfeiters because it is difficult to imitate the customer-specific retroreflective printing. However, in order to determine authenticity of the laminates, special retroreflective viewing equipment is required to view the customer-specific printing. Tampering is indicated by damage to the continuity of the retroreflective layer, visible as dark lines or discoloration which does not retroreflect. Therefore, it is difficult to detect authenticity of the document with the naked eye. This type of laminate is also expensive to manufacture due to multiple layers and a sophisticated process control which is necessary to manufacture the laminate.

Multilayer film constructions containing intermediate layers having optical properties such as holograms or kinegrams are often used in security laminates. EP-A-0 000 401 describes such laminate constructions. If the security laminate in these constructions is disturbed due to tampering, the holograms are destroyed. Tampering is therefore-readily apparent when viewing the document with the naked eye. However, the film layer containing the holographic optical pattern is not transparent and is also quite expensive. These laminate constructions do not overcome all of the problems associated with security laminates because it is undesirable to cover an entire document or package with an opaque, expensive multilayer film. Further, it is necessary to properly register the opaque hologram on the document so as not to obscure any underlying data.

One relatively inexpensive laminate-construction is described in DE-C-25 11 367. This reference discloses laminating a document between two films and further including a pattern of adhesion-reducing coating either on the film or on the document before laminating. Once the layers are laminated, little or no bond exists in those places coated with the adhesion-reducing coating. Attempts to tamper a document laminated with such a construction ordinarily result in destruction of the article to which the laminate is adhered. However, skilled tamperers are capable of removing the film without damaging the underlying article by using heat.

U.S. Pat. Nos. 4,876,123 and 5,082,702 disclose tamper-proof multilayer films Which are not transparent. During attempts to tamper, the multilayer constructions are destroyed and both sides of the separated film layers display an originally concealed colored print. Tampering with these constructions is apparent to the unaided eye and the films are also impossible to laminate together without visible damage. However, laminates having these constructions are not useful on identification documents because they are not transparent.

U.S. Pat. No. 5,153,042 discloses a tamper-indicating labelstock or security laminate comprised of a transparent facestock, a release coating attached to one surface of the facestock for providing an indicia, a polymer coated on the facestock and release coating, a frangible metal layer and an adhesive layer. The labelstock is easily broken when tampering occurs which reveals the indicia printed by the release coating. Construction of this laminate requires a flood coating of primer over the release coating. Since this laminate is intended for use as a labelstock, it is easily delaminated. Such a construction is not ideal for security laminates used to protect documents because the laminate is not durable enough and would split prematurely under everyday abuse. Also, this type of construction is easily delaminated with heat rendering tampering possible.

A transparent self-adhesive film which includes printing is described in DE-A-28 03 434. When the film is lifted during tampering, the printing remains on the document. If a photograph is exchanged for the original, the tamperer must only reproduce the printing on the new photograph which is a relatively easy task for a skilled tamperer. Constructions such as those described do not overcome the problem of imitation by tamperers.

Security laminates have also included an intermediate layer of ink-containing microcapsules as described in FR-A-2 451 081. The capsules break during tampering which results in discoloration of the document. Although tampering is readily apparent to the unaided eye, the microcapsules create at least two disadvantages which are unacceptable in the field of transparent security laminates. The microcapsules reduce the transparency of the film and the microcapsules break during normal use of the document. Thus, such a laminate is too fragile for use on identification cards subjected to daily abuses which would cause the microcapsules to fracture.

Another method of manufacturing tamper-proof documents is described in DE-C-29 52 322. A document is coated with a polyethylene film coated with an adhesive which requires cross-linking by ultraviolet irradiation. The resultant laminate provides a high degree of security, however, it is again prohibitively expensive to place irradiation equipment and the corresponding protection equipment at every document distribution location.

None of the references described above solve the problems with security laminates. That is, a security laminate which is inexpensive to manufacture and to apply to documents and has sufficient durability for identification cards. Further, the security laminate must be transparent, difficult to imitate by counterfeiters and must readily evidence tampering, even when heat tampering is employed.

SUMMARY OF THE INVENTION

The present invention provides a laminate, a secured document, and a method for securing documents.

A transparent security laminate comprising, in brief summary, (1) a protective layer having a first and a second surface, (2) a pattern of low adhesion coating bonded to a portion of the second surface of the protective layer, (3) at least one emblem bonded to a portion of the low-adhesion coating and to a portion of the second surface of the protective layer, (4) a pressure sensitive adhesive bonded to the emblem layer and to a portion of the low adhesion coating layer and to a portion of the protective layer, and (5) a primer is not included between the low adhesion coating and the emblem layers; wherein the bond between the emblem and the protective layer and the bond between the adhesive layer and protective layer are the most tenacious bonds, and the bond between the low adhesion coating and the protective layer is the least tenacious such that the emblem and adhesive layers are damaged in the pattern of the low adhesion layer when the laminate is peeled from a document. The bond between low adhesion coating and protective layer is relatively strong in order to provide a laminated document with good durability.

The present invention provides a security laminate which is inexpensive to manufacture and to apply to documents. The present invention also provides a security laminate which readily evidences tampering and is difficult to imitate by counterfeiters.

BRIEF DESCRIPTION OF THE DRAWINGS

The invention is further explained with reference to the drawings, wherein.

These figures, which are idealized are not to scale and are intended as merely illustrative and non-limiting.

DETAILED DESCRIPTION OF ILLUSTRATIVE EMBODIMENTS OF THE INVENTION

Figure 1:
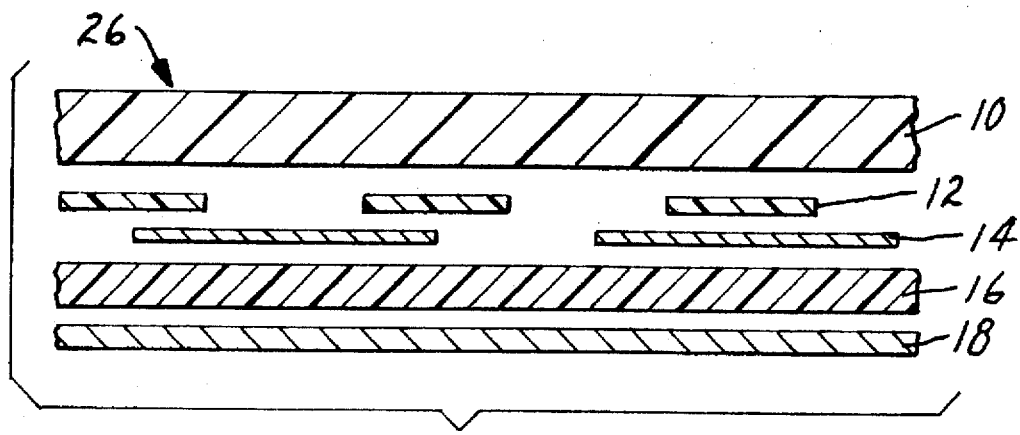
FIG. 1 is an exploded cross-section of the security laminate of the present invention adhered to a document.

The laminate of the present invention is shown generally in FIG. 1 as 26. The laminate of the invention is comprised of at least four layers designated as the protective layer 10, low adhesion coating layer 12, emblem layer 14, and the adhesive layer 16. Each of the layers is first described ion detail followed by a discussion of the interaction of the layers by the corresponding tenacities of the bonds between the layers. For purposes of this disclosure, the term "delaminate" refers to attempting to remove a laminate from the document or article to which the laminate is adhered.

Protective Layer

A protective layer 10 is provided. The protective layer 10 provides protection for the underlying article, protecting the article against cuts, scratches or other similar abuse. In addition, the protective layer 10 ultimately covers the underlying article or document 18 such that one must lift the protective layer 10, along with the rest of the laminate, in order to tamper with the article 18. The protective layer 10 is preferably transparent, allowing use of the security laminate 26 on identification documents such as driver's licenses and passports. Additionally, the protective layer 10 is preferably substantially impervious to scratches. This characteristic allows use of the laminate 26 on articles which are subjected to daily abuse. Examples of suitable materials for the protective layer of the invention include primed or unprimed polyethylene terephthalate (polyester), polyvinyl, chloride, polyolefins, or cellulose acetate films. Preferably, primed polyester is used if the invention is intended for use on identification documents, whereas polyvinylchloride is the preferred protective layer material if the laminate is intended for use on lower value documents or items in order to limit material costs. In another embodiment, polyolefin films which shrink when exposed to heat are suitable for use as the protective layer of the present invention. Examples of these heat shrinking films which are commonly known in the art are window insulating films.

Low Adhesion Coating Layer

Figure 3:
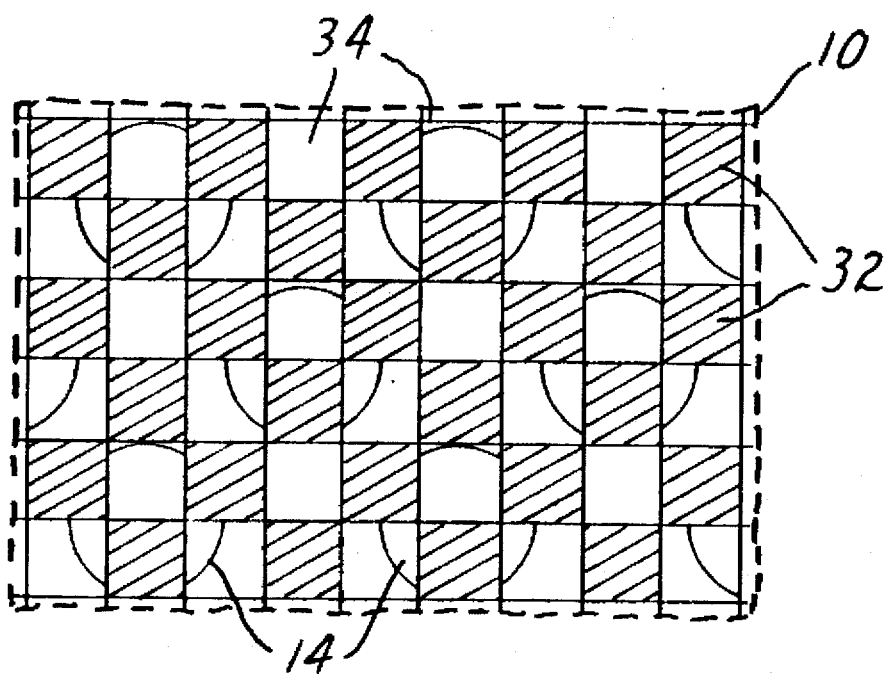
FIG. 3 is a top view of the laminate of FIG. 2.

A low adhesion coating 12 is next printed on the protective layer 10 and is preferably transparent. The low adhesion coating is preferably printed on the protective layer 10 in a pattern such that the low adhesion coating 12 only partially covers the protective layer 10. During delamination, the low adhesion coating 12 allows for removal of the protective layer from the rest of the laminate composite in those areas which are printed with the low adhesion coating 12, allowing for controlled failure of the laminate composite 26. Most preferably, the low adhesion coating 12, is printed in a repetitive pattern. Examples of some preferred patterns include, but are not limited to, checkerboard, dots, legible messages such as "VOID" and logos. FIG. 3 depicts a laminate which was removed from an article having a low adhesion coating 12 printed in a checkerboard fashion.

Examples of suitable low adhesion coatings are cellulose acetate butyrate, vinyl acetate-dibutyl maleate, vinyl alcohol silicone emulsions, or preferably water-based ethylene acrylic acid or water-based acrylic. The purpose of the low adhesion coating 12 is more fully described below when interaction of the layers and corresponding bonds between the layers of the present invention are discussed.

Emblem Layer

The emblem layer 14 is comprised of at least one emblem or logo which at least partially covers the protective layer 10. After the low adhesion coating 12 is bonded to the protective layer 10, the emblem layer 14 is printed or applied over the low adhesion coating 12. Since the low adhesion coating 12 is patterned, the low adhesion coating 12 only partially covers the protective layer 10. Where the low adhesion coating 12 is bonded to the protective layer 10, the emblem layer 14 is applied onto the low adhesion coating 12. However, where the low adhesion coating 12 is absent, the emblems 14 are applied directly onto the protective layer 10.

The emblem layer 14 of the invention is preferably an easily identifiable shape and is printed or applied as a repetitive pattern substantially across the surface of the protective layer 10 low adhesion layer 12 composite.

The emblem(s) 14 of the invention are applied using any number of materials. The materials may or may not be visible to the unaided eye. Examples of materials which are visible to the unaided eye and suited for the present invention include pearlescent pigments that subtly change color as the viewing angle is changed. Pearlescent pigments include titanium dioxide, bismuth oxychloride, or guanine. Liquid crystal polymers which change color as the viewing angle is changed such as those manufactured by Wacker Chemie of Munich, Germany are also suitable for use in the present invention. Yet another ink which is suitable for the present invention and changes color as the viewing angle is altered are optionally variable inks such as those manufactured by SICPA of Switzerland. Thin hologram transfer films are another option for constructing the emblem layer 14. Opaque embossed holograms and transparent embossed holograms both change color with the viewing angle, examples of which are manufactured by Light Impressions, Inc. of Santa Cruz, Calif.

Materials which are also suited for the emblem layer 14 of present invention are those which are transparent to the unaided eye but are visible when viewing the emblem through a viewing device. An example of such a material is Black Light Varnish (Werneke of St. Paul, Minn.) which is invisible under ambient light, but visible under ultraviolet light. Additionally, a material which is a hybrid of those described above would also be useful in the current invention. An example of such a hybrid material is a material that appears one color under a first wavelength light but changes color under a second wavelength light. Fluorescent neodymium oxide is an example of such a material. These hybrid materials are particularly desirable for preventing imitation and color copying by counterfeiters because the materials appear a different color under ambient light than under tamper-detecting light. The material used to print the emblem layer 14 of the present invention preferably is one which is visible to the unaided eye but is very difficult for the counterfeiter to imitate or duplicate. Examples of preferred materials include but are not limited to those nontransparent materials which change color as the viewing angle is altered such as pearlescent pigments printed in a fine line pattern so as not to obscure underlying document data, and holograms.

Adhesive Layer

A pressure sensitive adhesive 16 is bonded to the protective layer 10/low adhesion coating 12/emblem layer 14 composite. Among other things, the adhesive allows adherence of the laminate composite to an article or document 18. A pressure sensitive adhesive such as 3M Brand High Temperature Acrylic Pressure Sensitive Adhesive #966 (3M Company, St. Paul, Minn.) is used in a preferred embodiment. The pressure sensitive adhesive allows for inexpensive application of the laminate to an article because a heat laminator is not required. Additionally, a laminate of the present invention which uses pressure sensitive adhesive will evidence tampering if the document is delaminated under heated conditions. Since pressure sensitive adhesives soften when heated one would expect the pressure sensitive adhesive to lift off the document when heated. However, due to the construction of the present invention and the low adhesion pattern coating, the pressure sensitive adhesive splits and pulls apart even when heated, thus evidencing tampering.

Pressure sensitive adhesives are less expensive and easier to adhere than heat activated adhesives. Heat activated laminates suffer the drawback that the additional equipment of a heat laminator is required to adhere the laminate to a document or an article. This creates a greater expense than applying a pressure sensitive adhesive-containing laminate and makes the laminate useless in areas where electricity is not available to operate the heat laminator.

Bond Tenacities

The relative bond tenacities between the adjacent layers of the laminate are important to the present invention. A controlled failure is preferred when an attempt is made to delaminate documents laminated with the present inventions. Separation of the layers due to delamination is first discussed followed by a discussion, of the relative bond tenacities between the layers required to obtain such a controlled failure of the laminate.

Figure 2:
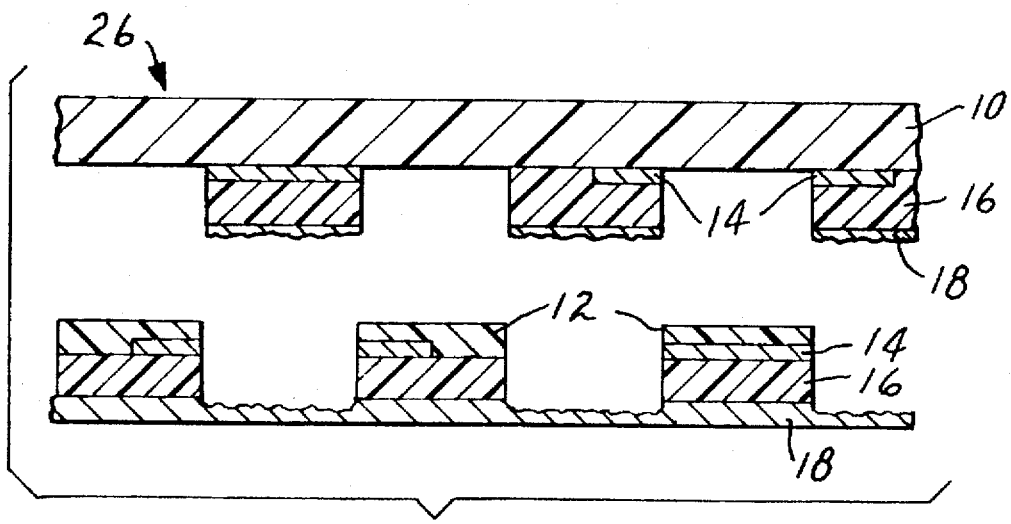
FIG. 2 is a cross-section of the security laminate of FIG. 1 after an attempt to delaminate the document.

Upon an attempt to remove the laminate 26 from a document 18, the laminate of the invention splits substantially in a manner depicted in FIG. 2. The protective layer 10 lifts, bringing with it the adhesive 16 and the emblem layers 14 in the areas where the emblem layer 14 and the adhesive layer 16 are adhered directly to the protective layer 10. The low adhesion coating 12 which is printed in a pattern prevents the adhesive 16 and emblem layers 14 from adhering to the protective layer 10 and lifting off the document 18 across the entire surface of the protective coating 10.

FIG. 3 depicts a top view of a laminate of the invention once it has been removed from a document. The area represented as 32 shows where the low adhesion coating was printed. Area 32 on the protective coating 10 does not have any emblem or adhesive adhering thereto. In contrast, area 34 depicts the area where the low adhesion coating 12 was absent, The adhesive 16 and the emblems 14 thus adhered to the protective layer 10 in a checkerboard pattern complementary to the pattern which the low adhesion coating was printed. This controlled failure renders it impossible to adhere the laminate back together or to reuse the laminate on a different document once a document has been delaminated without evidencing the tampering. Both the emblems 14 and adhesive 16 have been damaged and are impossible to match-up due to the thickness of the damaged adhesive 16 since the emblems have been distorted when the adhesive stretched and split. This, therefore, prevents successful repositioning of the emblems 14.

In order to obtain such a controlled failure upon delaminating, the bond between the emblem 14 and the protective layer 10 and the bond between the adhesive 16 and protective layer 10 and the bond between the document 18 and the adhesive layer 16 are the most tenacious bonds in the construction of the security laminate of the present invention. The bonds between the low adhesion coating 12 and the protective layer 10 is the least tenacious. However, this bond must still be strong enough to provide a durable laminate for ID cards.

Durability testing includes exposing a security laminated document to a laundry and drying cycle, flexing the document, and shaking the document in a paint shaker with sand and water. Laminates with the constructions described above will withstand the above durability testing. By withstanding durability testing it is meant that if the security laminate of the invention is adhered to a standard identification card, the laminate will show substantially no premature release of the low adhesion coating from the protective layer.

The selection of the protective layer 10, the low adhesion coating 12, the emblem layer 14, and the adhesive 16 must be made as a combination to provide suitable bond tenacities between the adjacent layers. Examples of combinations providing suitable bond tenacity differentials are presented in the Examples below. It is contemplated that many other combinations will also satisfy the requirements for constructing a security laminate according to the present invention.

EXAMPLES

The invention is further explained by the following illustrative examples which are intended as non-limiting.

Each Example includes a discussion of how the particular laminate was manufactured, how the pouch for the identification document was fabricated, how the laminate was applied to a document, and finally, how the laminate appeared after delamination.

EXAMPLE 1

Laminate Preparation

MELINEX Brand 505 primed polyester film manufactured by ICI of Wilmimgton, Del. was printed with a checkerboard pattern of low adhesion coating using a flexographic printing press. Adcote 50T4983 water-based ethylene acrylic acid as manufactured by Morton of Chicago, Ill. was used as the low adhesion coating. Pearlescent logos of Mearlite UWA bismuth oxychloride (Mearl Co. of New York, N.Y.) in Bayhydrol 123 water-based urethane (Miles of Pittsburgh, Pa.) was printed on the low adhesion coating/polyester film composite. A pressure sensitive transfer adhesive of PSA 966 high temperature acrylic (3M of St. Paul, Minn.) coated on silicone release liner was laminated to the printed polyester using a nip roll on a continuous laminator.

Pouch Fabrication

Figure 4:
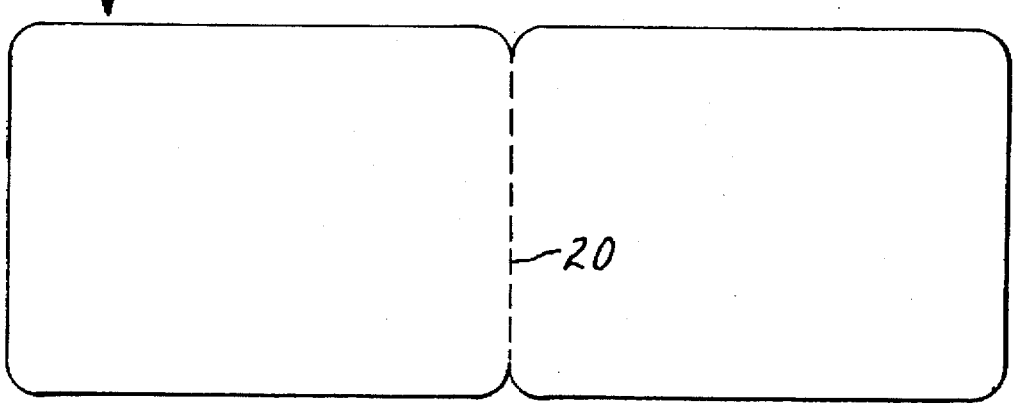
FIG. 4 is a top view of a pouch shape useful with the present security laminate.

Pouches as shown in FIG. 4 were fabricated from a roll of the laminate described above. A die was fabricated to cut a perforated line 20 through the polyester side of the laminate. The perforated line consisted of a line of approximately 3 mm cut length alternating with an approximately 1 mm uncut length. The die also cut a symmetrical, butterfly shaped pouch with rounded edges from the laminate with the perforated cut line serving as the center line. The pouches remained adhered to a continuous sheet of silicone liner since the cut lines only penetrated through the laminate and not the liner.

Applying Laminate Pouch to Document

An identification card document was made by gluing a photo to a paper card document. The pouch was peeled from the silicone liner. Next, the document was placed in the center of one side of the pouch leaving about a 3 mm border of laminate surrounding the document. The pouch was folded at the perforation line 20 which conveniently positioned the two sides of the pouch in proper alignment over one another. The laminate was smoothed over the document using a hand squeegee to ensure the pouch was securely adhered to the document and to ensure that the edges of the pouch were adhered to each other, thus sealing the pouch.

Durability Testing

The laminated card was subjected to the following testing to evaluate the durability of the construction:

A. Washing Machine

The laminated card was placed in a washing machine filled with clothes and placed on the permanent press cycle followed by drying for 30 minutes on the permanent press cycle. The laminate and card were not damaged. The low adhesion coating did not release from the protective layer.

B. Flexing

The laminated card was flexed back and forth at 90 degree angles for 1000 cycles using a Getty Fatigue Flex Tester model #0 manufactured by Getty Machine and Mold Company of Clifton, N.J. The laminate and card were not damaged.

C. Severe Durability Test

The laminated card was placed in a 1 gallon paint can with 20 milliliters of water and 10 grams of sand and shaken in a paint shaker for 15 minutes. Minimal delamination of the adhesive from the protective layer occurred only at the corners of the card. Durability was acceptable when compared to standard ID card laminates such as 3M Scotchpak Brand polyester laminate with hot melt adhesive.

Tampering

A. Ambient Temperature Tampering

The laminate was peeled from the card at room temperature in an attempt to reach and alter the underlying document. Where the laminate was adhered to the paper, the paper split internally, destroying the document. Where the laminate was adhered to the photo, the laminate split in the following manner. The polyester layer of the laminate was lifted along with the portion of the logo which was printed directly on the polyester and the adhesive. The adhesive and the portion of the logo which was printed on the low adhesion coating remained on the document. Because the low adhesion coating was originally printed on the polyester in a checkerboard pattern, the adhesive and the pearlescent logos were caused to split in a complimentary checkerboard fashion due to the varying bond differentials between each of the layers.

B. Heat Tampering

The laminate was heated to about 104° C. on a hot plate and peeled from the card at the elevated temperature to determine whether heat tampering of the laminate was evident. When heated, the laminate split across both photo and the paper portions of the document in a similar manner as described in Example 1. The portion of the logo which remained on the adhesive on the document was distorted due to stretching of the adhesive. The logos could therefore not be matched up to reconstruct the laminate, and the tampering was evident.

EXAMPLE 2

To reduce material costs from the construction of the Example 1 laminate, a protective layer such as Pentaprint polyvinyl chloride film as manufactured by Klockner of Gordonsville, Va. could be used in place of polyester. The laminate preparation, the pouch fabrication, and applying the laminate to a document would then follow the same protocol as described in Example 1, except the low adhesion coating would be SSW-4010 water-based acrylic as manufactured by Werneke of St. Paul, Minn. instead of the Adcote 50T4983.

Tampering

It is expected that use of polyvinyl chloride film would increase the heat tamper resistance because the protective layer would soften and distort as well as the emblem and adhesive layer splitting as described above in Example 1.

EXAMPLE 3

To further improve heat resistance of the security laminate, 2 mil polyolefin film which shrinks when exposed to heat, as made by Packaging Consultants of St. Paul, Minn., was used in the construction of the Example 1 laminate for the protective layer in place of the polyester. Heat shrink film (olefinic polymer) was laminated to PSA 966 pressure sensitive adhesive by using a hand squeegee. Low adhesion coating patterns and pearlescent logos could be applied to the heat shrink film before lamination of the adhesive. Corona treatment or other priming techniques could be used to enhance adhesion between the film and the adhesive. The film/adhesive construction was laminated to a paper document using a hand squeegee.

Tampering

Attempts to tamper the sample over a range of temperatures from room temperature to above 121° C. were unsuccessful. At about 93° C. and higher, the shrink film began to shrink away from the paper, taking adhesive and sometimes print and paper with it. Above about 121° C., the film shrunk to a ball, completely destroying the laminate and in some cases, the print and surface of the paper as well. The laminate was rendered totally unusable and the document was partially or complete destroyed.

EXAMPLE 4

A hologram could be incorporated into a laminate by printing Melinex 505 primed polyester with a checkerboard pattern of Adcote 50T4983 as in Example 1. An area of holographic embossing film using nitrocellulose, styrene, or acrylic based resins, could be hot transferred over the checkerboard pattern. A transparent reflector, such as Bismuth Oxide or Zinc Sulfide, could be vapor deposited on the hologram, or an opaque Aluminum reflector could be used. A pressure sensitive adhesive, such as PSA 966 from Example 1, could be laminated to the hologram. The laminate could be applied to a document as explained in Example 1.

Tampering

It is expected that when the laminate is peeled from the card at room temperature, the hologram layer and adhesive would split in the same manner as described in Example 1.

EXAMPLE 5

Peel Testing

A one inch wide sample was prepared by laminating two pieces of the laminate described in Example 1 together with the adhesive facing each other using a hand squeegee. A peel test was performed at room temperature using an Instron peel tester with a 50 pound load cell, and a cross head speed of 12 inches per minute. The two pieces were peeled apart at a 180 degree angle from each other. The peel force ranged from a minimum of 30 grams per inch to a maximum of 120 grams per inch with an average of 75 grams per inch. The wide range of peel strengths was caused by areas with the low adhesion coating having weak adhesion to the protective layer and areas with logos and adhesive having stronger adhesion to the protective layer.

Various modifications and alterations of this invention will become apparent to those skilled in the art without departing from the scope and spirit of this invention.

We claim:

1. A security laminate comprising:
   (a) a protective layer having a major surface,
   (b) a patterned low adhesion coating layer bonded to a portion of said major surface,
   (c) a discontinuous emblem layer comprising at least one emblem, a portion of which is bonded to the major surface and a portion of which is bonded to the coating layer, and
   (d) an adhesive layer bonded to the emblem layer, for bonding the laminate to an object;
   wherein the bond between the coating layer and the protective layer is less tenacious than the bond between any other two layers of the laminate, whereby the emblem layer is damaged in the pattern of the low adhesion coating during delamination of the protective layer from the object to provide an indication of tampering.

2. The security laminate of claim 1 wherein said low adhesion coating comprises ethylene acrylic acid.

3. The security laminate of claim 1 wherein said low adhesion coating comprises an acrylic resin.

4. The security laminate of claim 1 wherein said low adhesion coating is invisible to the unaided eye.

5. The security laminate of claim 1 wherein said emblem layer is visible to the unaided eye.

6. The security laminate of claim 1 wherein said emblem layer is pearlescent printing, ultraviolet visible printing, holographic embossing, or a combination thereof.

7. The security laminate of claim 1 wherein the emblem layer is substantially transparent to the unaided eye.

8. The security laminate of claim 1 wherein the protective layer comprises a film selected from the group consisting of polyester, polyvinyl chloride or polyolefin film.

9. The security laminate of claim 1 wherein the adhesive layer is comprised of a pressure sensitive adhesive.

10. The security laminate of claim 9 further including a release liner bonded to the pressure sensitive adhesive layer.

11. The security lamimate of claim 1 wherein said laminate is perforated.

12. The security laminate of claim 11 wherein said perforations divide the laminate into two pieces of substantially equal size.

13. The security laminate of claim 10 wherein said release liner includes a plurality of security laminates bonded thereto in adjacent relationship.

14. The security laminate of claim 1, wherein said bond between the coating layer and the emblem layer is a primerless bond.

15. The security laminate of claim 1, wherein said laminate is adhered to at least one major surface of a document.

16. The security laminate of claim 1, wherein said adhesive layer is bonded to both the emblem layer and to the coating layer.

17. The security laminate of claim 1, wherein said adhesive layer is bonded to the emblem layer, to the coating layer, and to the protective layer.

* * * * *